United States Patent

[11] 3,550,886

| [72] | Inventor | John H. Cave |
| | | Chatham, N.J. |
| [21] | Appl. No. | 788,273 |
| [22] | Filed | Dec. 31, 1968 |
| [45] | Patented | Dec. 29, 1970 |
| [73] | Assignee | Bell Telephone Laboratories, Incorporated |
| | | Murray Hill, N.J. |
| | | a corporation of New York |

[54] RETAINING MEANS FOR HOLDING AN END OF A CYLINDRICAL OBJECT
7 Claims, 4 Drawing Figs.

[52] U.S. Cl. .................................................. 248/56, 285/158, 285/414
[51] Int. Cl. .................................................... F16l 5/00
[50] Field of Search ........................................ 248/56, 27(Cursory); 285/412, 414, 406, 200, 158

[56] References Cited
UNITED STATES PATENTS
2,328,419 8/1943 Brown ........................... 285/414X

| 2,931,672 | 4/1960 | Merritt ........................ | 248/56X |
| 3,058,759 | 10/1962 | McDuff ....................... | 248/56X |

FOREIGN PATENTS

| 842,542 | 7/1960 | Great Britain ................ | 285/406 |

Primary Examiner—Chancellor E. Harris
Attorneys—R. J. Guenther and William L. Keefauver ABSTRACT: Retaining means for holding and supporting an end of a rigid cylindrical object without applying any bending force or transverse load to the cylindrical object. The retaining means comprise a tubular support for surrounding the end portion of the object. A flexible diaphragm member is adapted to encircle the end of the object. This diaphragm member is pressed and held against the end of the tubular support by a plurality of improved self-positioning rim-clenching clamps which do not need to be initially positioned against a rim that is to be clamped. The construction is such that it can be easily and quickly installed by an unskilled worker.

INVENTOR
J. H. CAVE
BY
B. R. Stoddard
ATTORNEY

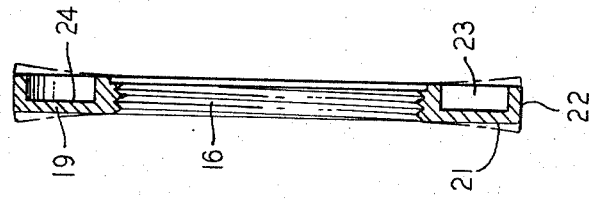
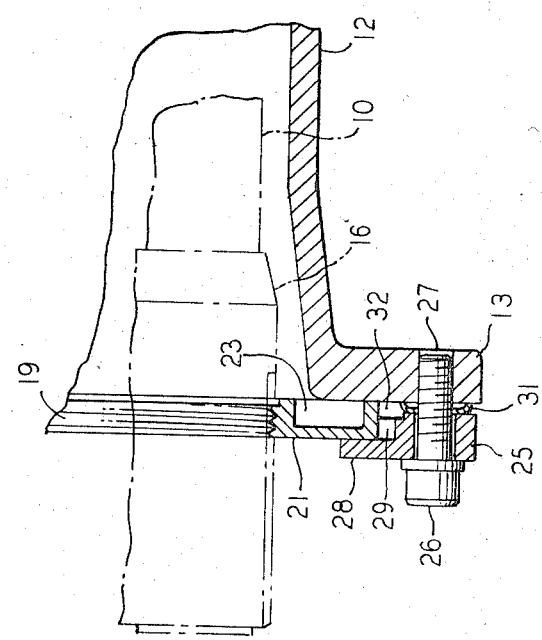
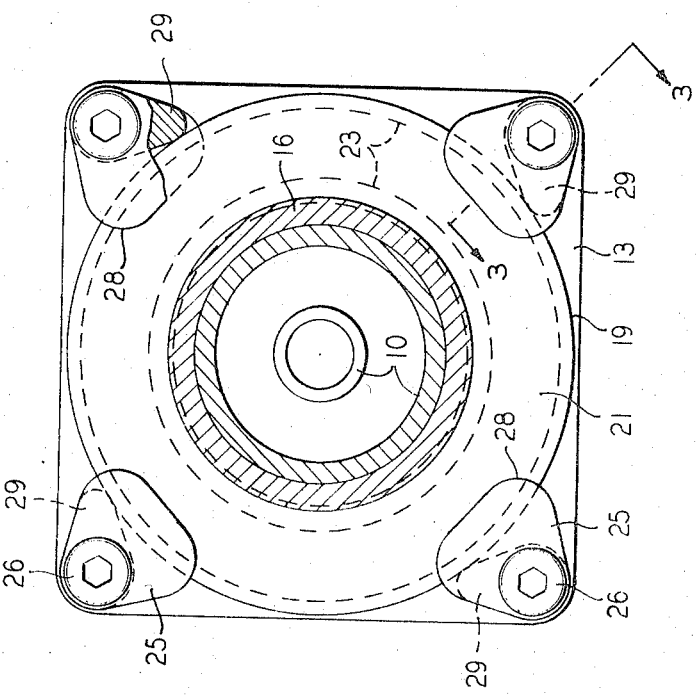

3,550,886

RETAINING MEANS FOR HOLDING AN END OF A CYLINDRICAL OBJECT

GOVERNMENT CONTRACT

The invention herein claimed was made in the course of, or under contract with The Department of the Army.

BACKGROUND OF THE INVENTION

This invention relates to improved retaining means for supporting and holding an end of a rigid cylindrical object, such as a coaxial line or a laser tube, projecting outward at an appreciable distance from a panel.

One of the problems encountered in the mass production of retaining means for holding the free end of a rigid cylindrical object is the hazard of imposing an external bending force upon the cylindrical object. Such a bending force is liable to occur due to slight variations in the protruding length of the cylindrical object. It can also be caused by radial displacement of the tube from a nominal position. In addition, it can result from differential thermal expansion between the cylindrical object and the retaining means.

SUMMARY OF THE INVENTION

The present invention is designed to provide retaining means for holding the end of a cylindrical object without applying an external bending force to the cylindrical object. This is accomplished by constructing the retaining means in such a manner that they automatically compensate for alignment errors, variations in length, and differential thermal expansion. Thus, the retaining means of this invention are automatically self-compensating or self-adjusting as is described in detail hereinafter.

Briefly, the retaining means comprise a tubular support having a flange at each end and adapted to surround the cylindrical object. One of the flanges is fastened to the panel from which the cylindrical object protrudes. The other flange is adapted to abut against a flat flexible coupling ring which encircles the protruding end of the cylindrical object. This ring has a thin annular section which functions in the manner of a diaphragm to permit flexure of the ring in order to compensate for thermal expansion or variations in the axial length of the tubular support and the cylindrical object.

The flexible ring is held against the flange on the supporting tube by a plurality of improved rim clenching clamps. Each of these clamps has an extended upper portion which is adapted to overlie the edge of the flexible ring. The lower portion of each clamp is formed in the shape of a cam and is integrally made in one piece with the upper portion. The clamps are attached to the flange on the ring by means of screws.

Each screw carries a spring which is mounted between the associated rim clenching clamp and the flange so as to push the clamp against the head of the screw. This causes the clamp to turn when its screw is tightened. The turning movement of each clamp is stopped when its cam portion engages and abuts against the rim of the flexible ring. This serves to clench the rim of the ring securely even though there may be axial displacement of the projecting end of the cylindrical object. These rim clenching clamps are self-positioning because they do not need to be initially located directly against the rim that is to be clenched.

Thus, the ring couples the end of the coaxial line to the flange on the tubular support without imposing any bending force on the coaxial line. This is due to the fact that the coupling ring functions in the manner of a sling to suspend the end of the coaxial line from the tubular support so that no transverse load is applied to the coaxial line.

BRIEF DESCRIPTION OF THE DRAWING

The features of this invention are more fully discussed hereinafter in connection with the following detailed description of the drawing in which:

FIG. 2 is an end view of the cylindrical object and the retaining means taken along the line 2-2 in FIG. 1;

FIG. 3 is a view on an enlarged scale taken along the line 3-3 in FIG. 2 and particularly illustrating the rim clenching clamp; and FIG. 4 is a sectional view of the flexible ring.

DETAILED DESCRIPTION

Figure 1:
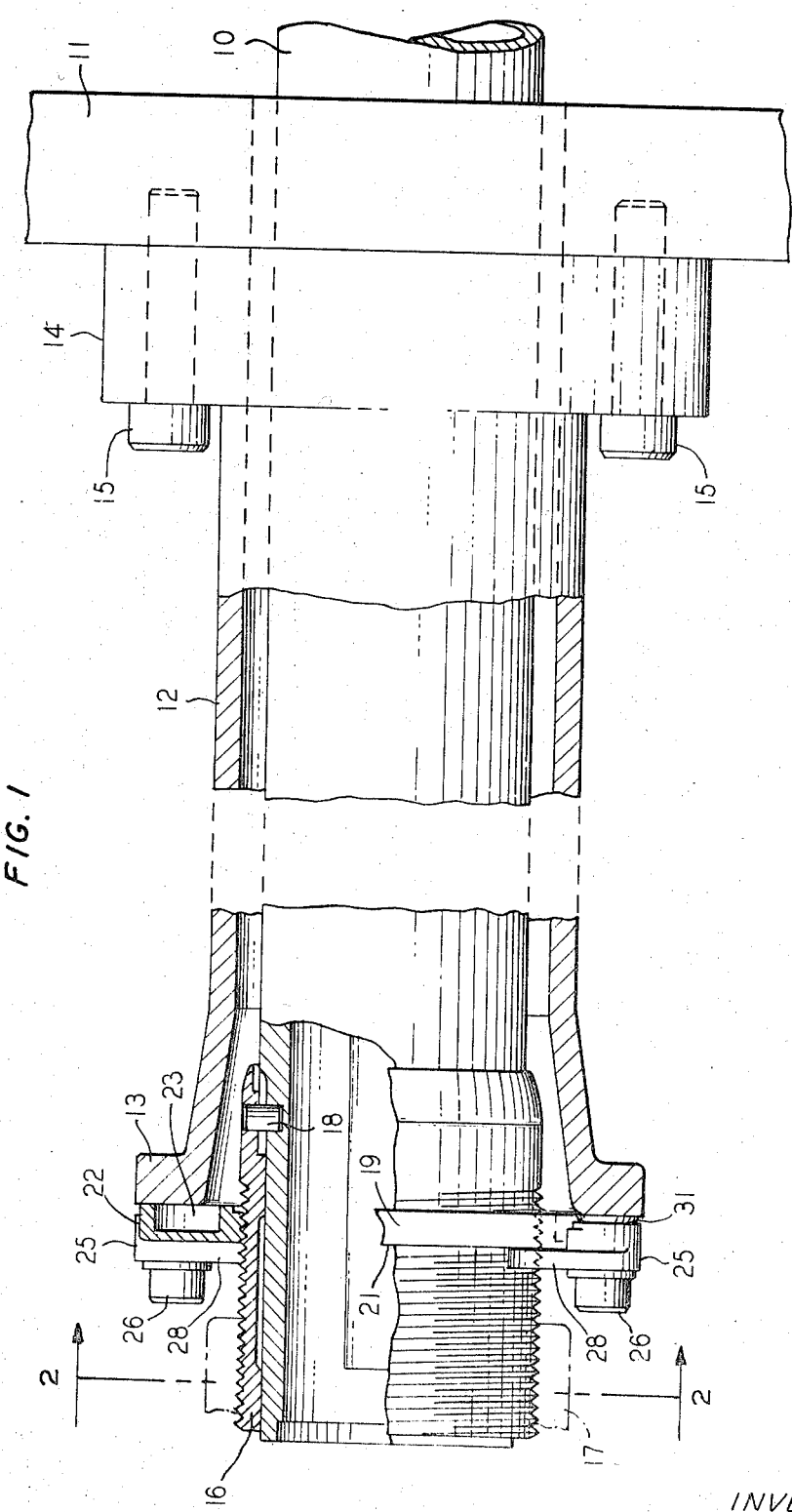
FIG. 1 is a side view, partly in section, of a cylindrical object supported and held by improved retaining means constructed in accordance with this invention.

The invention will now be described with reference to a specific exemplary embodiment thereof; namely, retaining means for supporting and holding an end of a coaxial line 10 protruding through a hole in a panel 11. As is shown in FIG. 1, the coaxial line 10 is enclosed or surrounded by a tubular support 12 having a small peripheral flange 13 at its left end and a large peripheral flange 14 at its right end. The tubular support 12 is securely fastened to the panel 11 by screws 15 which pass through the large flange 14 into the panel 11. The left flange 13 is not circular when viewed from the front but, instead, is square, as is shown in FIG. 2, for a purpose described hereinafter.

The left end of the coaxial line 10 is enclosed within a sleeve 16 which may be used to couple the coaxial line 10 to other electronic equipment by means of a coupling nut 17. For the purpose of simplicity this other equipment is not shown in the drawing. The sleeve 16 is attached to the coaxial line 10 in any suitable manner, such as by threading. After the sleeve 16 has been placed in the desired position on the coaxial line 10, it is prevented from turning by a stop pin 18. The external surface of the sleeve 16 is threaded as is illustrated in FIG. 1.

It should be noted at this point, that the left end of the coaxial line 10 does not touch the tubular support 12 and is not, as yet, supported therefrom.

In order to support the left end of the coaxial line 10, a flat coupling ring 19 is employed. The coupling ring 19 is made of any suitable material which will permit it to be flexible. The ring 19 has a top surface 21 and a peripheral rim 22. The ring 19 also has a central hole or circular opening which is internally threaded so that it can be attached to, and mounted on, the sleeve 16 as is best seen in FIG. 4. It is to be understood that, if the sleeve 16 were not used, the ring 19 would then be made with a slightly smaller circular opening and would be mounted directly on the coaxial line 10. In either case, the ring 19 encompasses or encircles the coaxial line 10 and is securely attached thereto. During the process of installing the coupling ring 19, it is moved toward the right in FIG. 1 by turning it on the threads until it abuts against the flange 13 on the tubular support 12.

The flexibility of the coupling ring 19 is enhanced by fabricating it in such a manner that it has a circular or annular groove or channel 23 therein. The base or bottom 24 of this channel 23 is, of course, thinner and weaker than the remainder of the ring 19. This thin annular section 24 of the ring 19 functions in the manner of a diaphragm and greatly increases the flexibility of the ring 19. Thus, the diaphragm portion 24 readily permits flexure of the ring 19 either toward or away from the direction of the flange 13 as is represented by the broken lines in FIG. 4. Such bending or flexure of the ring 19 serves to compensate for differences in the axial length of either the coaxial line 10 or the tubular support 12. It also acts to accommodate changes in axial length due to thermal expansion of either the coaxial line 10 or the tubular support 12. These function functions of the ring 19 are performed without imposing any bending force or transverse load upon the coaxial line 10.

The ring 19 is turned manually on the threads until it abuts against the flange 13. It is then securely fastened to the flange 13 by means of fastening instrumentalities comprising four improved rim clenching clamps 25 each mounted loosely on a respectively different cap screw 26. These cap screws 26 are adapted to be received within holes 27 which are drilled near each corner of the flange 13 which, as was stated above, has a square shape when viewed from the front. One of these holes 27 is shown in FIG. 3.

Each of the rim clenching clamps 25 comprises an outer extended upper portion 28 which is adapted to overlie part of the top surface 21 of the ring 19 as is shown in the drawing. Each clamp 25 also includes a lower portion 29 formed in the shape of a cam and adapted to abut against the peripheral rim 22 of the ring 19 as is best seen in FIG. 2. Each clamp 25 is a unitary piece because its lower portion 29 is integrally made in one piece with the upper portion 28.

Each of the cap screws 26 carries a spring device, such as a dished washer 31, which is positioned between the cam portion 29 of the respectively associated clamp 25 and the flange 13 as is best shown in FIG. 3. These spring washers 31 are designed to push their associated clamps 25 outward against the heads of the cap screws 26 and thereby establish frictional engagement between the clamps 25 and the heads of the screws 26.

Because of this frictional engagement, the rim clenching clamps 25 will turn or rotate in a clockwise direction when the screws 26 are tightened in their associated holes 27 in the flange 13. This turning movement causes the lower cam-shaped portions 29 to rotate until each of them engages and abuts against the edge of the peripheral rim 22 of the ring 19. Due to this engagement of the four cam portions 29 with the rim 22 of the ring 19, the ring 19 is clenched in place and is held against movement thereof. It should be noted that the rim clenching clamps 25 are self-positioning because they do not need to be initially located directly against the rim 22 that is to be clenched.

Further tightening of the screws 26 presses the outer top portions 28 of the clamps 25 against the top surface 21 of the ring 19 thereby securely clamping and holding the coupling ring 19. Since the ring 19 is thus firmly held, it, in turn, will securely hold and support the left end of the coaxial line 10 without imposing any bending force thereon. This is due to the fact that the coupling ring 19 functions in the manner of a sling to suspend the end of the coaxial line 10 from the tubular support 12 so that no transverse load is applied to the coaxial line 10.

The retaining means can be easily and quickly disengaged by simply turning the cap screws 26 in the opposite direction. The frictional engagement between the clamps 25 and the screws 26, which is produced by the springs 31, causes the clamps 25 to rotate in a counterclockwise direction. This causes the cam portions 29 to turn away from the rim 22 of the ring 21. Also, the loosening of the screws 26 permits the springs 31 to push the top portions 28 of the clamps 25 upward and out of engagement with the top surface 21 of the ring 21.

It should be noted that the screws 26 are spaced an appreciable distance from the rim 22 of the ring 19 as is shown in FIG. 2. This provides a space 32, which is best seen in FIG. 3, between the rim 22 of the ring 19 and the cam portion 29 of the clamps 25. This space 32 enables the clamps 25 and their cam portions 29 to be self-positioning in that the ring 19 will be securely held even though there may be radial displacement of the projecting left end of the coaxial line 10. In other words, this construction accommodates itself to axial misalignment of the coaxial line 10 within the limits determined by the positions of the four cap screws 26.

Because of the improved retaining means of this invention, the protruding end of the coaxial line 10 can be quickly supported by an unskilled worker in a simple manner which is summarized as follows. The tubular support 12 is slipped over the coaxial line 10 and is fastened to the panel 11 by the screws 15. The coupling ring 19 is then threaded in place manually until it abuts against the flange 13. Finally, the cap screws 26, which are carrying the clamps 25, are manually inserted in the holes 27 and are tightened. This completes the operation.

Thus, due to the self-adjusting flexure of the diaphragm portion of the coupling ring 19 and also to the self-positioning of the cam portions of the rim clenching clamps 25, these installations can be performed on a mass production basis by unskilled workers.

I claim:

1. Retaining means for holding and suspending one end of a horizontally disposed cylindrical object without imposing any bending force on said object:

said retaining means comprising a tubular support adapted for surrounding at least a portion of the length of said object without touching it;

said tubular support having a first end and a second end;

supporting means for supporting said tubular support in a horizontal position;

said supporting means including a vertically disposed supporting member and means for attaching said first end of said tubular support to said vertically disposed supporting member;

means acting in the manner of a sling for suspending said end of said cylindrical object from said second end of said tubular support;

said last mentioned means including holding means adapted for encircling said end of said cylindrical object;

fastening means for fastening said holding means to said second end of said tubular support;

said holding means comprising a flat flexible member having means defining a circular opening therein adapted for receiving therein said end of said cylindrical object;

said holding means further comprising compensating means for increasing the flexibility of said member for compensating for thermal expansion of said cylindrical object and said tubular support;

said compensating means including an annular portion of said member;

said annular portion being so disposed as to surround said opening in said member;

said annular portion having a channel formed therein; and said channel having a base which is thinner and weaker than said flat member whereby said channel functions in the manner of a flexible diaphragm for facilitating flexure of said member.

2. Retaining means for holding and suspending one end of a horizontally disposed cylindrical object without imposing any bending force on said object:

said retaining means comprising a tubular support adapted for surrounding at least a portion of the length of said object without touching it;

said tubular support having a first end and a second end;

supporting means for supporting said tubular support in a horizontal position;

said supporting means including a vertically disposed supporting member and means for attaching said first end of said tubular support to said vertically disposed supporting member;

means acting in the manner of a sling for suspending said end of said cylindrical object from said second end of said tubular support;

said last mentioned means including means adapted for encircling said end of said cylindrical object;

fastening means for fastening said holding means to said second end of said tubular support;

said holding means being formed with a peripheral rim;

said fastening means comprising a plurality of fastening instrumentalities each including a clamping member adapted for clamping said holding means against said second end of said tubular support; and each of said plurality of fastening instrumentalities further including a clenching member adapted for engaging and clenching said peripheral rim of said holding means.

3. Retaining means for holding and suspending one end of a horizontally disposed cylindrical object without imposing any bending force on said object:

said retaining means comprising a tubular support adapted for surrounding at least a portion of the length of said object without touching it;

said tubular support having a first end and a second end;

supporting means for supporting said tubular support in a horizontal position;

said supporting means including a vertically disposed supporting member and means for attaching said first end of said tubular support to said vertically disposed supporting member;

means acting in the manner of a sling for suspending said end of said cylindrical object from said second end of said tubular support;

said last mentioned means including holding means adapted for encircling said end of said cylindrical object;

fastening means for fastening said holding means to said second end of said tubular support;

said holding means being formed with a peripheral rim;

said fastening means comprising a plurality of fastening instrumentalities each including a clamping member adapted for clamping said holding means against said second end of said tubular support;

each of said fastening instrumentalities further including a clenching member adapted for clenching said peripheral rim of said holding means; and each of said fastening instrumentalities being a unitary piece having its clamping member fabricated integrally in one piece with its clenching member.

4. Retaining means in accordance with claim 3 wherein said fastening means include a plurality of screws each having a head and a point, and wherein each of said screws is adapted to pass loosely through a respectively different one of said fastening instrumentalities with the head of each screw against its respectively associated clamping member and with the point of each screw passing through said holding means and into said second end of said tubular support.

5. Retaining means in accordance with claim 4 and further including means for rotating said clamping members and said clenching members in response to rotation of their respectively associated screws, said last mentioned means including a plurality of spring means each mounted on a respectively different one of said screws and adapted for pressing said members toward the head of their respectively associated screws for establishing frictional engagement therebetween.

6. Retaining means adapted for holding an end of a cylindrical object:

said object having a peripheral rim;

said retaining means comprising rim clenching means adapted for engaging said peripheral rim;

said rim clenching means including a screw having a head;

a cam-shaped member mounted loosely on said screw and normally out of engagement with said rim of said object;

means for rotating said cam-shaped member into abutment with said rim in response to rotation of said screw; and said last mentioned means including spring means adapted for pressing said cam-shaped member toward the head of said screw for establishing frictional engagement therebetween.

7. Retaining means adapted for holding a cylindrical object and for pressing it against a surface:

said object having a peripheral rim and a top area;

said retaining means including a rim clenching clamp comprising an outer extended portion adapted to overlie said rim and said top area of said object;

an inner portion formed in the shape of a cam;

a screw for fastening both of said portions to said surface;

said screw being adapted to pass loosely through both of said portions with the head of the screw against said outer portion and the point of the screw in said surface;

said outer extended portion being adapted to be pressed against said top area of said object in response to tightening of said screw;

means for rotating said inner cam-shaped in response into abutment against said rim of said object in response to tightening of said screw; and said last mentioned means including spring means for pressing said portions toward the head of said screw for establishing frictional engagement therebetween.